United States Patent Office 3,198,724
Patented Aug. 3, 1965

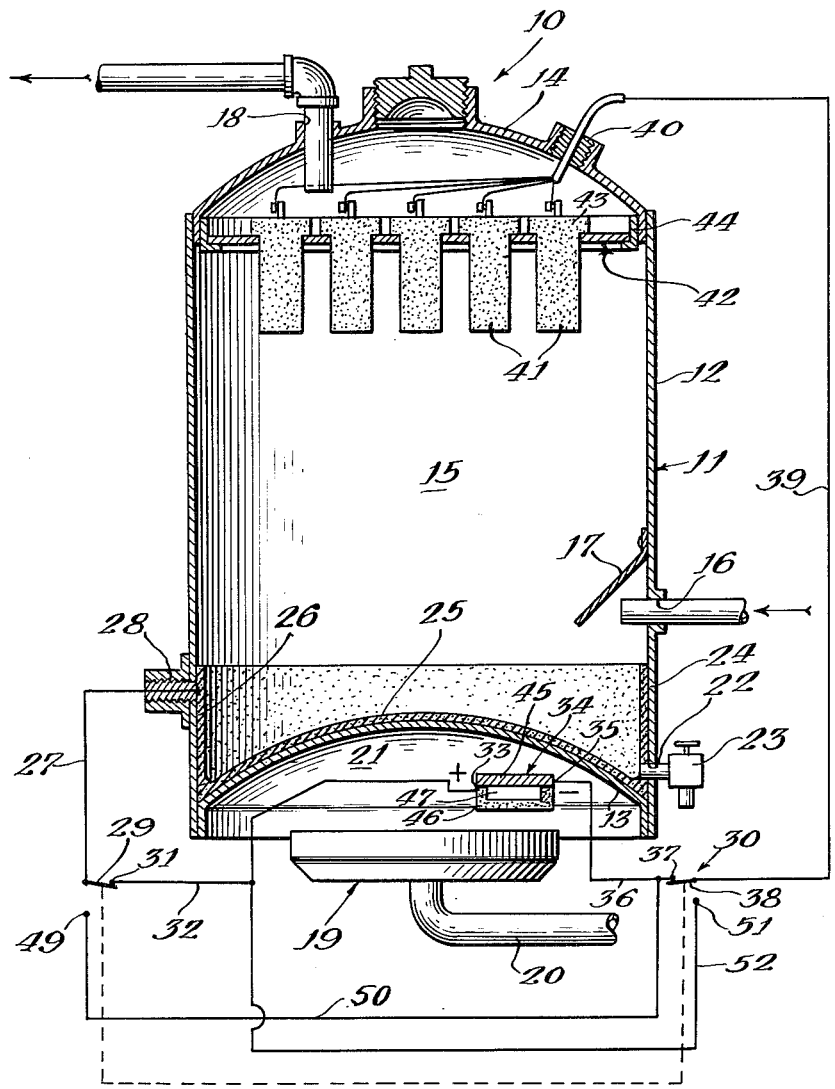

3,198,724
HOT WATER HEATER WITH ELECTRICAL SCALE CONTROL
John T. Cross and David Cohen, St. Joseph, Mich., assignors to Whirlpool Corporation, a corporation of Delaware
Filed Aug. 17, 1960, Ser. No. 50,261
3 Claims. (Cl. 204—299)

This invention relates to hot water heaters and in particular to preventing undesirable scale formation in hot water heaters.

A serious problem encountered in the operation of hot water heaters, such as conventional home hot water heaters, is the formation of scale on the inner surfaces of the tank. Such scale, comprising a precipitate of calcium carbonate, calcium sulfate, etc. tends to form on the portion of the tank at the highest temperature, such as the portion of the tank heated by the associated burner means, conventionally the bottom of the tank. The layer of scale which builds up on the bottom of the tank substantially reduces the efficiency of heat transfer therethrough, thereby causing the temperature of the tank metal to rise to a point where the metal is fatigued and caused to rupture.

Waters found in different geographical locations may vary widely in different characteristics such as the pH, quantity of solids dissolved therein, and the nature of the dissolved solids. However, the principal dissolved solid in substantially all such natural waters is calcium carbonate. It has long been erroneously considered that calcium carbonate particulates carry a negative electrical charge, and no satisfactory method of precluding scaling by such calcium carbonate particulates has heretofore been developed, principally because of the failures of the art in the past to fully understand the true nature of the problem. It has now been determined that such calcium carbonate particulates exhibit a positive zeta potential in such waters. The present invention is concerned with a hot water heater in which this electro-positive characteristic of the calcium carbonate particulates is utilized to eliminate undesirable scale formation on the inner tank surfaces.

One feature of the present invention is, therefore, the provision of a new and improved hot water heater.

Another feature of the invention is the provision of such a hot water heater having new and improved means for precluding the formation of scale on the inner tank surfaces.

A further feature of the invention is the provision of such a hot water heater including new and improved electrical means for preventing formation of scale on the tank walls.

Still another feature of the invention is a provision of such a hot water heater including a tank for holding water to be heated, means for delivering heat energy through one portion of the tank, a graphite anode covering the inner surface of the one tank portion, a cathode spaced from the anode to have contact with the water in the tank, and means causing a direct current of at least approximately 0.8 milliampere per square inch to flow to the water in the tank from the anode through the cathode.

A yet further feature of the invention is the provision of such a hot water heater wherein the anode comprises a graphite liner and is cemented to the inner surface of the one tank portion by dielectric means.

A yet further feature of the invention is the provision of such a hot water heater including means for reversing the current flow when desired to cause the scale collected on the cathode electrode to drop therefrom, and means for flushing the dropped scale from the tank.

Other features and advantages of the invention will be apparent from the following description taken in connection with the accompanying drawing wherein the figure is a schematic, diagrammatic, diametric section of a hot water heater embodying the invention with means defining a direct current source being schematically illustrated in association therewith.

In the exemplary embodiment of the invention, as disclosed in the drawing, a hot water heater generally designated 10 is shown to comprise a water tank generally designated 11 including a tubular portion 12 closed at its lower end by a bottom wall 13 and at its upper end by a cover 14. Cold water is delivered to the space 15 within the tank 11 through an inlet 16 adjacent the lower end of the tank and provided with a suitable baffle 17, the hot water (not shown) being delivered from the tank through an outlet 18 in the cover 14. A burner 19 of suitable construction, fed with suitable fuel through a delivery conduit 20, is disposed below the bottom wall 13 for delivering heat energy through the bottom wall to the water in tank space 15. Bottom wall 13 is preferably domed, providing a heating space 21 above the heater 19. Extending through tubular wall 12 adjacent bottom wall 13 is a flushing outlet 22 controlled by a suitable valve 23 permitting the tank 11 to be flushed by the operator as desired.

The present invention comprehends the provision, in combination with such a hot water tank structure, of electrical means for preventing scale formation on the inner surface of the tank walls, and in particular on the relatively hot inner surface of the bottom wall 13 and the adjacent inner surface of the lower end 24 of the tubular side wall 12. For this purpose, an inert, electrically and thermally conductive liner 25 is provided on the inner surfaces of the bottom wall 13 and tubular wall end portion 24. Herein, the liner is formed of graphite and is cemented to the inner surfaces of the bottom wall 13 and tubular wall end portion 24 preferably by a thermally conductive, dielectric cement 26 such as the beryllium oxide resin composition disclosed in copending Faneuf application Serial No. 35,044, filed June 9, 1960 and now abandoned, assigned to the assignee hereof. Alternatively, the liner may be formed of platinum cemented to the tank wall by a similar cement composition. While the protective liner may be arranged to cover substantially the entire inner surface of the tank, substantially scale-free operation of the tank may be effected with the liner extending over only the lower surface areas as shown.

Liner 25 is connected by a wire 27 extending outwardly through tank wall 12 through a suitable insulating bushing 28 to one movable contact 29 of a double pole-double throw switch 30, the associated fixed contact 31 of switch 30 being conected by a suitable wire 32 to the positive terminal 33 of an electrical power source 34. The negative terminal 35 of the power source 34 is connected by a wire 36 to a first fixed contact 37 associated with a second movable contact 38 of switch 30 while movable contact 38 is connected by a wire 39 which extends through a suitable bushing 40 in the cover 14 to a plurality of electrodes 41 carried on an insulating support 42 in the upper portion of space 15. Herein the electrodes 41 comprise graphite rods extending downwardly through the support 42, one end electrode being provided with enlarged upper portion 43 removably supported on the upper surface of the support. As shown, the support 42 may be secured to the cover by a suitable annular L-shaped bracket 44.

Herein the electrical supply 34 comprises a thermalelectric converter in space 21 including an upper disc 45 and a lower disc 46 defining therebetween an evacuated space 47. Heat from burner 19 causes the temperature of the lower disc 46 to be somewhat higher than the temperature of the upper disc 45 and thus electrons are transferred through space 47 from the lower disc to the upper disc providing a suitable electrical potential between the terminals 33 and 35 to cause a current flow from graphite liner 25 to electrodes 41. By thus making the graphite liner 25 a positively charged anode and the electrodes 41 a negatively charged cathode, the electric current passes through the water in space 15 in the proper direction to preclude scale deposition on the tank walls, causing the particulate calcium carbonate in the water to migrate to the electrodes 41 to be deposited thereon. The graphite liner 25 on the bottom wall 13 of the tank has a high thermal conductivity and, as scale is prevented from being formed thereon, high efficiency of heat transfer from the burner 19 to the water in tank space 15 is maintained.

More specifically, it has been found that effective prevention of scale formation on tank walls requires a current density of at least approximately 1.5 milliamperes per square inch. A direct current of approximately 1.5 milliamperes per square inch has been found to be highly effective for descaling the graphite liner 25 where it has become scaled as by operation of the hot water heater without employing the scale preventing means discussed above.

To remove the calcium carbonate material from the electrodes 41 when desired, the switch 30 may be manipulated to connect movable contact 29 with a fixed contact 49 connected by a wire 50 to wire 36, and connect movable contact 38 to a fixed contact 51 connected by a wire 52 to wire 32. Thus, the graphite liner 25 is connected to the negative terminal 35 of the electrical power source 34 making the graphite liner the cathode, and the electrodes 41 are connected to the positive terminal 33 of the power source 34 making the electrodes the anode of the electrical system. The current flowing through the water in space 15 now causes the calcium carbonate previously deposited on the electrodes 41 to flake off and settle on the liner 25. However, the flaked scale particles do not adhere to the liner and may be readily removed from the tank by flushing the tank through suitable operation of valve 23 controlling the flushing outlet 22.

It has further been found that during the normal operation of the hot water heater 10, wherein switch 30 is arranged to make liner 25 the positively charged anode and the electrodes 41 the negatively charged cathode, the scale on the electrodes 41 tends to build up only to a preselected point and then further particulates migrating to the electrodes 41 tends to fall therefrom generally in the manner of the falling of the scale from the electrodes during the reverse current operation discussed above. The fallen scale may be removed periodically from the hot water heater by suitably flushing the tank through outlet 22 at intervals determined by the rapidity with which the scale is formed.

In addition to providing an effective electrically conductive anode, the graphite liner by virtue of its inert characteristics provides an improved corrosion resistance at the tank surface most susceptible to corrosion, namely the surfaces adjacent the burner 19. Thus, even without providing the desirable electrical current through the tank by means of the anode liner 25, an improved operation of the hot water heater results from the use of the graphite liner.

Having described out invention as related to the embodiment shown in the accompanying drawing, it is our intention that the invention be not limited by any of the details of description, unless otherwise specified, but rather be construed broadly within its spirit and scope as set out in the accompanying claims.

We claim:

1. A hot water heater comprising: a tank for holding water to be heated; means for delivering heat energy through one portion of the tank; an inert, conductive liner; dielectric means securing the liner to the inner surface of said one tank portion to cover said tank portion; an electrode spaced from the liner to have contact with water in the tank; and means causing a direct current of at least approximately 0.8 milliampere per square inch to flow through the water in the tank from the liner to the electrode whereby the liner effectively comprises an anode and the electrode effectively comprises a cathode.

2. A hot water heater comprising: a tank for holding water to be heated; means for delivering heat energy through one portion of the tank; an inert, conductive liner; dielectric material coating a substantial area of the inner surface of the tank and including a portion cementing the liner to the inner surface of said one tank portion; an electrode spaced from the liner to have contact with water in the tank; and means causing a direct current of at least approximately 0.8 milliampere per square inch to flow through the water in the tank from the liner to the electrode whereby the liner effectively comprises an anode and the electrode effectively comprises a cathode.

3. A hot water heater comprising: a tank for holding water to be heated; means for delivering heat energy though one portion of the tank; a graphite liner covering the inner surface of said one tank portion; an electrode spaced from the liner to have contact with water in the tank; and means causing a direct current of at least approximately 0.8 milliampere per square inch to flow through one portion of the tank; a graphite liner covering electrode whereby the liner effectively comprises an anode and the electrode effectively comprises a cathode.

References Cited by the Examiner

UNITED STATES PATENTS

| | | | |
|---|---|---|---|
| 88,285 | 3/69 | Farmer | 204—196 |
| 1,579,453 | 4/26 | Neeley | 204—196 |
| 1,825,477 | 9/31 | Reichart | 204—147 |
| 2,401,151 | 5/46 | Haberstump | 122—17 |
| 2,576,680 | 11/51 | Guitton | 204—147 |

JOHN H. MACK, *Primary Examiner.*